US009663657B2

(12) United States Patent
Dinkar et al.

(10) Patent No.: US 9,663,657 B2
(45) Date of Patent: May 30, 2017

(54) MOISTURE CURABLE ORGANOPOLYSILOXANE COMPOSITIONS

(71) Applicants: Sumi Dinkar, Bangalore (IN); Anantharaman Dhanabalan, Bangalore (IN)

(72) Inventors: Sumi Dinkar, Bangalore (IN); Anantharaman Dhanabalan, Bangalore (IN)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 0 days.

(21) Appl. No.: 14/365,300

(22) PCT Filed: Dec. 7, 2012

(86) PCT No.: PCT/US2012/068344
§ 371 (c)(1),
(2) Date: Jun. 13, 2014

(87) PCT Pub. No.: WO2013/090127
PCT Pub. Date: Jun. 20, 2013

(65) Prior Publication Data
US 2014/0350175 A1    Nov. 27, 2014

Related U.S. Application Data

(60) Provisional application No. 61/570,989, filed on Dec. 15, 2011.

(51) Int. Cl.
| | | |
|---|---|---|
| C08L 83/04 | (2006.01) | |
| C09J 183/04 | (2006.01) | |
| C09D 183/04 | (2006.01) | |
| C08G 65/336 | (2006.01) | |
| C08G 77/16 | (2006.01) | |

(52) U.S. Cl.
CPC ......... C08L 83/04 (2013.01); C08G 65/336 (2013.01); C09D 183/04 (2013.01); C09J 183/04 (2013.01); C08G 77/16 (2013.01)

(58) Field of Classification Search
CPC ........ C08G 77/18; C08G 77/70; C09J 183/04; C08L 101/10
USPC ......................................................... 528/12
See application file for complete search history.

(56) References Cited

U.S. PATENT DOCUMENTS

| | | | |
|---|---|---|---|
| 2,191,587 A | 2/1940 | Rethreck | |
| 2,958,688 A | 11/1960 | Brooks et al. | |
| 3,278,457 A | 10/1966 | Milgrom | |
| 3,278,458 A | 10/1966 | Belner | |
| 3,278,459 A | 10/1966 | Herold | |
| 3,427,256 A | 2/1969 | Milgrom | |
| 3,427,334 A | 2/1969 | Belner | |
| 3,427,335 A | 2/1969 | Herold | |
| 3,627,722 A | 12/1971 | Seiter | |
| 3,632,557 A | 1/1972 | Brode | |
| 3,786,081 A | 1/1974 | Oppenlaender et al. | |
| 3,890,269 A | 6/1975 | Martin | |
| 3,936,578 A | 2/1976 | Dumoulin et al. | |
| 3,960,575 A | 6/1976 | Martin | |
| 3,971,751 A | 7/1976 | Isayama et al. | |
| 4,247,330 A | 1/1981 | Sanders, Jr. | |
| 4,248,992 A | 2/1981 | Takago | |
| 4,312,801 A | 1/1982 | Hiriart Bodin et al. | |
| 4,345,053 A | 8/1982 | Rizk et al. | |
| 4,379,766 A | 4/1983 | Mack et al. | |
| 4,404,348 A | 9/1983 | Fau et al. | |
| 4,410,677 A | 10/1983 | Lampe | |
| 4,481,367 A | 11/1984 | Knopf | |
| 4,528,353 A | 7/1985 | Lucas et al. | |
| 4,537,942 A | 8/1985 | Brown-Wensley et al. | |
| 4,612,054 A | 9/1986 | Hamon | |
| 4,625,012 A | 11/1986 | Rizk et al. | |
| 4,665,116 A | 5/1987 | Kornhaber et al. | |
| 4,769,412 A | 9/1988 | Inoue et al. | |
| 4,985,491 A | 1/1991 | Reisch | |
| 5,194,489 A | 3/1993 | Frances et al. | |
| 5,271,570 A | 12/1993 | Satake et al. | |
| 5,304,621 A | 4/1994 | Staiger et al. | |
| 5,395,860 A | 3/1995 | Leung et al. | |
| 5,472,987 A | 12/1995 | Reedy et al. | |

(Continued)

FOREIGN PATENT DOCUMENTS

| | | |
|---|---|---|
| CN | 1071349 C | 9/2001 |
| CN | 1590457 A | 3/2005 |

(Continued)

OTHER PUBLICATIONS

US 5,536,414, 06/1996, Delfort et al. (withdrawn)
International Search Report and Written Opinion of the International Searching Authority, PCT/US12/68344, Jan. 29, 2013.
Extended European Search Report prepared for European Patent Application No. 12856993.6, dated May 15, 2015.
Chinese Office Action prepared for Chinese Patent Application No. 201280069590.2, dated Aug. 14, 2015.
Patel et al., "Impact of thermal ageing on the tin catalyst species in room temperature vulcanised polysiloxane rubbers", Polymer Degradation and Stability, 83 (2004) pp. 157-161.
Toynbee, "Silane crosslinking of polyolefins: observations on the tin catalyst employed", Polymer, vol. 35, No. 2, 1994.

(Continued)

*Primary Examiner* — Kuo-Liang Peng
(74) *Attorney, Agent, or Firm* — Joseph Waters; McDonald Hopkins LLC

(57) ABSTRACT

The present invention provides curable compositions that are substantially free of metal catalysts including both tin and non-tin metal catalysts. The curable compositions employ a catalyst system comprising the combination of a carboxylic acid, an amino-containing adhesion promoter or a mixture of amine-containing adhesion promoters and an amino-containing siloxane. The combination of these materials accelerates the condensation curing of moisture curable silicones/non-silicones even in the absence of a metal-based catalyst.

25 Claims, No Drawings

(56) References Cited

U.S. PATENT DOCUMENTS

| | | |
|---|---|---|
| 5,502,144 A | 3/1996 | Kuo et al. |
| 5,623,044 A | 4/1997 | Chiao |
| 5,705,561 A | 1/1998 | Kozakiewicz et al. |
| 5,741,839 A | 4/1998 | Scheim |
| 5,840,428 A | 11/1998 | Blizzard et al. |
| 5,840,800 A | 11/1998 | Joffre et al. |
| 5,852,137 A | 12/1998 | Hsieh et al. |
| 5,858,280 A | 1/1999 | Zhang et al. |
| 5,919,888 A | 7/1999 | Lawrey et al. |
| 5,932,650 A | 8/1999 | Bayly |
| 5,945,466 A | 8/1999 | Ikeno et al. |
| 5,985,991 A | 11/1999 | Beljanski et al. |
| 6,072,013 A | 6/2000 | Manzouji et al. |
| 6,162,756 A | 12/2000 | Friebe et al. |
| 6,207,794 B1 | 3/2001 | Yamasaki et al. |
| 6,303,731 B1 | 10/2001 | Carlson et al. |
| 6,310,170 B1 | 10/2001 | Johnston et al. |
| 6,359,101 B1 | 3/2002 | O'Connor et al. |
| 6,369,184 B1 | 4/2002 | Bohin et al. |
| 6,515,164 B1 | 2/2003 | Bolte et al. |
| 6,599,633 B1 | 7/2003 | Wolf et al. |
| 6,696,383 B1 | 2/2004 | Le-Khac et al. |
| 6,753,400 B2 | 6/2004 | Inoue et al. |
| 6,797,912 B2 | 9/2004 | Derehag et al. |
| 6,827,875 B2 | 12/2004 | Schelhaas et al. |
| 6,833,423 B2 | 12/2004 | Roesler et al. |
| 6,875,864 B2 | 4/2005 | Pillai et al. |
| 6,911,109 B2 | 6/2005 | Giroux et al. |
| 6,919,293 B1 | 7/2005 | Ooms et al. |
| 7,115,695 B2 | 10/2006 | Okamoto et al. |
| 7,351,782 B2 | 4/2008 | Wakabayashi et al. |
| 7,365,145 B2 | 4/2008 | Yang et al. |
| 7,504,468 B2 | 3/2009 | Guennouni et al. |
| 7,527,838 B2 | 5/2009 | Correia |
| 7,541,076 B2 | 6/2009 | Landon |
| 7,550,547 B2 | 6/2009 | Wakabayashi et al. |
| 7,553,901 B2 | 6/2009 | Horikoshi et al. |
| 7,569,653 B2 | 8/2009 | Landon |
| 7,605,220 B2 | 10/2009 | Wakabayashi et al. |
| 7,642,331 B2 | 1/2010 | Pouchelon et al. |
| 7,732,554 B2 | 6/2010 | O'Keefe et al. |
| 7,772,332 B2 | 8/2010 | Wakabayashi et al. |
| 7,781,513 B2 | 8/2010 | Lucas et al. |
| 7,781,525 B2 | 8/2010 | Yano et al. |
| 7,863,398 B2 | 1/2011 | Devi et al. |
| 8,076,401 B2 | 12/2011 | Schindler et al. |
| 8,242,226 B2 | 8/2012 | Maliverney et al. |
| 8,426,546 B2 | 4/2013 | Maliverney et al. |
| 8,461,283 B2 | 6/2013 | Maliverney et al. |
| 8,586,688 B2 | 11/2013 | Okamoto et al. |
| 2009/0088547 A | 4/2000 | Schamschurin et al. |
| 2002/0146573 A1 | 10/2002 | Shimada et al. |
| 2002/0156210 A1 | 10/2002 | Luo |
| 2002/0198352 A1 | 12/2002 | Tanaka et al. |
| 2003/0069379 A1 | 4/2003 | Inoue et al. |
| 2004/0122253 A1 | 6/2004 | Smith et al. |
| 2004/0127669 A1 | 7/2004 | Ueno et al. |
| 2005/0020706 A1 | 1/2005 | Kollbach et al. |
| 2005/0054765 A1 | 3/2005 | Putzer |
| 2005/0137322 A1 | 6/2005 | Roesler |
| 2005/0171315 A1 | 8/2005 | Katsuyu et al. |
| 2006/0019398 A1 | 1/2006 | Corson et al. |
| 2007/0015893 A1 | 1/2007 | Hakuta et al. |
| 2007/0191541 A1 | 8/2007 | Guennouni et al. |
| 2007/0197820 A1 | 8/2007 | Van Holen et al. |
| 2007/0203297 A1 | 8/2007 | Wakabayashi et al. |
| 2007/0237912 A1 | 10/2007 | Correia |
| 2007/0275255 A1 | 11/2007 | Ooms |
| 2008/0039565 A1 | 2/2008 | Ridey et al. |
| 2008/0076843 A1 | 3/2008 | Clark |
| 2008/0188624 A1 | 8/2008 | Yano |
| 2008/0234426 A1 | 9/2008 | Kotani et al. |
| 2009/0018260 A1 | 1/2009 | Correia et al. |
| 2009/0087635 A1 | 4/2009 | Yano |
| 2009/0156737 A1 | 6/2009 | Schindler |
| 2009/0182091 A1 | 7/2009 | Noro |
| 2009/0182099 A1 | 7/2009 | Noro et al. |
| 2009/0186993 A1 | 7/2009 | Noro et al. |
| 2009/0299017 A1 | 12/2009 | Tsuno et al. |
| 2009/0306307 A1 | 12/2009 | Ahn et al. |
| 2010/0063215 A1 | 3/2010 | Yano et al. |
| 2010/0152373 A1* | 6/2010 | Wakabayashi et al. ...... 524/588 |
| 2010/0184883 A1 | 7/2010 | Detemmerman et al. |
| 2010/0197855 A1 | 8/2010 | Blom et al. |
| 2010/0234510 A1 | 9/2010 | Feder et al. |
| 2011/0009558 A1 | 1/2011 | Maliverney |
| 2011/0021684 A1* | 1/2011 | Maliverney .......... C08K 5/0091 524/403 |
| 2011/0028640 A1 | 2/2011 | Klein et al. |
| 2011/0028647 A1 | 2/2011 | Sixt et al. |
| 2011/0040034 A1 | 2/2011 | Maliverney et al. |
| 2011/0046299 A1 | 2/2011 | Maliverney et al. |
| 2011/0098392 A1 | 4/2011 | Barrandon et al. |
| 2011/0098425 A1 | 4/2011 | Takizawa |
| 2011/0124802 A1 | 5/2011 | Maliverney et al. |
| 2011/0281969 A1 | 11/2011 | Maliverney |
| 2012/0016063 A1 | 1/2012 | Maton et al. |
| 2012/0065308 A1 | 3/2012 | Sumi et al. |
| 2012/0172471 A1 | 7/2012 | Maliverney |
| 2012/0172473 A1 | 7/2012 | Maliverney |

FOREIGN PATENT DOCUMENTS

| | | |
|---|---|---|
| EP | 543292 A1 | 5/1992 |
| EP | 0604997 A2 | 7/1994 |
| EP | 525548 A2 | 11/1994 |
| EP | 1230298 B1 | 9/2003 |
| EP | 1731573 A1 | 12/2006 |
| EP | 1852472 A1 | 11/2007 |
| EP | 1985666 A1 | 10/2008 |
| EP | 2130873 A1 | 12/2009 |
| EP | 1550700 B1 | 1/2011 |
| EP | 0947531 B1 | 7/2011 |
| EP | 2388297 A1 | 11/2011 |
| EP | 2246393 A1 | 6/2014 |
| JP | 61225250 A | 9/1986 |
| JP | 63245466 A | 10/1988 |
| JP | 63265924 A | 11/1988 |
| JP | 5039428 A | 2/1993 |
| JP | 5117518 A | 5/1993 |
| JP | 0649210 A | 2/1994 |
| JP | 0673291 A | 6/1994 |
| JP | 6212077 A | 8/1994 |
| JP | 6345973 A | 12/1994 |
| JP | 7179762 A | 7/1995 |
| JP | 841358 A | 2/1996 |
| JP | 10101932 A | 4/1998 |
| JP | 11029713 A | 2/1999 |
| JP | 2001089618 A | 4/2001 |
| JP | 2001342363 A | 12/2001 |
| JP | 2003119387 A | 4/2003 |
| JP | 2006225629 A | 8/2006 |
| JP | 2006316287 A | 11/2006 |
| JP | 2008231142 A | 10/2008 |
| JP | 2009179776 A | 8/2009 |
| JP | 2010013524 A | 1/2010 |
| JP | 04472632 B2 | 6/2010 |
| JP | 2010168590 A | 8/2010 |
| JP | 04699897 B2 | 6/2011 |
| JP | 2011153309 A | 8/2011 |
| JP | 05080006 B2 | 11/2012 |
| JP | 04874650 B2 | 2/2015 |
| WO | 0060010 A1 | 10/2000 |
| WO | 2004099318 A | 11/2004 |
| WO | 2006070637 A | 7/2006 |
| WO | 2007064621 A1 | 6/2007 |
| WO | 2007094273 A | 8/2007 |
| WO | 2007094276 A | 8/2007 |
| WO | 2009106719 A1 | 9/2009 |
| WO | 2009106722 A1 | 9/2009 |
| WO | 2012134788 A1 | 10/2012 |
| WO | 2013013111 A1 | 1/2013 |
| WO | 2013026654 A1 | 2/2013 |

(56) References Cited

FOREIGN PATENT DOCUMENTS

| WO | 2013070227 A1 | 5/2013 |
|----|---------------|--------|
| WO | 2013117471 A1 | 5/2013 |
| WO | 2013142140 A1 | 9/2013 |

OTHER PUBLICATIONS

Goddard et al., Principles of Polymer Science and Technology in Cosmetics and Personal Care, 1999, Chapter 7, Marcel Dekker, Inc., New York, New York.
Grzelka et al., "Polysilxanol condensation and disproportionation in the presence of a superacid", Journal of Organic Chemistry, vol. 689, Issue 4 (2004), 705-713.
Munirathinam, R. et al., "Gallium-containing polymer brush film as efficient supported Lewis acid catalyst in a glass microractor." Beilstein Journal of Organic Chemistry. vol. 9 2013. pp. 1698-1704.
Glasovac, Z et al. "Synthesis of Highly Basic Hexasubstituted Biguanides by Environmentally Friendly Methods" Synlett, Oct. 14, 2013, pp. 2540-2544.
Pubchem Substance Summary for CHEMBL 1083796 Deposit Date Dec. 22, 2010; Modify Date Feb. 4, 2013.
Pubchem Substance Summary for ST51001443 Create Date Sep. 18, 2005.
State Intellectual Property Office of People's Republic of China, Notification of Second Office Action for Patent Application No. 201280069590.2, report issue date Mar. 30, 2016, 8 pgs., China.
The Korean Intellectual Property Office, Preliminary Notice of Rejection for Application No. 10-2014-7019557 filed Jul. 14, 2014, report issue date Nov. 30, 2015, 7 pgs., Korea.
First Office Action, JP 2014-547307, mailed on Oct. 4, 2016.

* cited by examiner

US 9,663,657 B2

MOISTURE CURABLE ORGANOPOLYSILOXANE COMPOSITIONS

CROSS REFERENCE TO RELATED APPLICATIONS

This application is a 35 U.S.C. 371 national stage filing and claims priority to PCT Application No. PCT/US2012/068344, entitled "Moisture Curable Organopolysiloxane Compositions" filed on Dec. 7, 2012, which claims the benefit of U.S. Provisional Patent Application No. 61/570,989 entitled "Moisture Curable Organopolysiloxane Compositions" filed on Dec. 15, 2011, both of which are incorporated herein in their entirety by reference.

FIELD

The present invention relates to curable compositions comprising curable polymers having reactive terminal silyl groups. In particular, the present invention provides curable compositions comprising a metal-free catalyst system as an alternative to organotin or other metal catalysts.

BACKGROUND

Polymers having reactive terminal silyl groups or compositions comprising such polymers can be hydrolyzed and condensed in the presence of water and organometal catalysts. Suitable known catalysts for curable compositions include organometallic compounds employing metals such as Sn, Ti, Zn or Ca. Organotin compounds such as, for example, dibutyltin dilaurate (DBTDL) are widely used as condensation cure catalysts to accelerate the moisture assisted curing of a number of different polyorganosiloxanes and non-silicone polymers having reactive terminal silyl groups such as room temperature vulcanizing (RTV) formulations including RTV-1 and RTV-2 formulations. Environmental regulatory agencies and directives, however, have increased or are expected to increase restrictions on the use of organotin compounds in formulated products. For example, while formulations with greater than 0.5 wt. % dibutyltin presently require labeling as toxic with reproductive 1B classification, dibutyltin-containing formulations are proposed to be completely phased out in consumer applications during the next 4-6 years.

Alternative organotin compounds such as dioctyltin compounds and dimethyltin compounds can only be considered as a short-term remedial plan, as these organotin compounds may also be regulated in the future. As alternatives to tin catalysts, efforts have been made to identify non-Sn metal-based catalysts that accelerate the condensation curing of moisture curable silicones and non-silicones. Desirably, substitutes for organotin catalysts should exhibit properties similar to organotin compounds in terms of curing, storage, and appearance. Non-tin catalysts would also desirably initiate the condensation reaction of the selected polymers and complete this reaction upon the surface and may be in the bulk in a desired time schedule. There are therefore many proposals for the replacement of organometallic tin compounds by other organometallic compounds. These compounds comprise metals such as Ca, Ce, Bi, Fe, Mo, Mn, Pb, Ti, V, Zn and Y. All of these metals have specific advantages and disadvantages in view of replacing tin compounds perfectly. Therefore, there is still a need to overcome some of the weaknesses of possible metal compounds as suitable catalyst for condensation cure reaction including the behavior of uncured and cured compositions to maintain the ability to adhere onto the surface of several substrates. Another problem necessary to be solved in the replacement of organo-tin compounds is for the reactive composition to maintain its ability to cure (when exposed to humidity or ambient air) after storage in a sealed cartridge.

SUMMARY

The present invention provides tin-free, curable compositions comprising silyl-terminated polymers and a non-toxic condensation catalyst. In particular, the present invention provides curable compositions employing a catalyst system that is substantially free of a metal or organometal catalyst complex.

In one aspect, the invention provides a curable composition exhibiting a relatively short tack-free time, curing through the bulk, as well as long storage stability in the cartridge, i.e., in the absence of humidity. The inventors have unexpectedly found that carboxylic acid compounds in combination with certain adhesion promoter components exhibit curing behavior similar to or even better than organo-tin compounds, and are therefore suitable as replacements for organotin or other metal-based catalysts in compositions having a reactive, silyl-terminated polymer that can undergo condensation reactions such as in RTV-1 sealant and RTV-2 formulations. Specifically, the inventors have found that carboxylic acid compounds in combination with amino-containing silane compounds (which may be used as adhesion promoters) act to catalyze the curing of organopolysiloxane compositions.

In one aspect, the present invention provides a curable composition comprising a moisture curable composition comprising a polymer component (A) comprising a reactive terminal silyl group; a cross-linker component (B); a carboxylic acid component (C); an amino-containing silane adhesion promoter or a mixture of amino-containing silane adhesion promoters (D), and optionally an amino-containing siloxane (E). In one embodiment, the composition is free of a metal or metal-based catalyst component.

In one aspect, the present invention provides a composition for forming a cured polymer composition comprising (A) a polymer having at least a reactive silylgroup; (B) a crosslinker or chain extender chosen from an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, and combinations of two or more thereof; (C) about 0.01-7 parts per weight per 100 parts per weight of the polymer (A) of a carboxylic acid; (D) at least one adhesion promoter chosen from a amino-containing silane or siloxane other than the compounds listed under (B); and (E) an amino-functional siloxane.

In another aspect, the polymer (A) has the formula: $[R^1_a R^2_{3-a} Si\text{—}Z\text{—}]_n\text{-}X\text{—}Z\text{—}SiR^1_a R^2_{3-a}$. In another embodiment, X is chosen from a polyurethane; a polyester; a polyether; a polycarbonate; a polyolefin; a polypropylene; a polyesterether; and a polyorganosiloxane having units of $R_3SiO_{1/2}$, $R_2SiO$, $RSiO_{3/2}$, and/or $SiO_{4/2}$, n is 0 to 100, a is 0 to 2, R and $R^1$ can be identical or different at the same Si-atom and chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof. In yet another aspect, $R^2$ is chosen from OH, a $C_1$-$C_8$-alkoxy, a $C_2$-$C_{18}$-alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is a divalent unit selected from the group of a $C_1$-$C_8$ alkylene, or O.

According to one embodiment, the crosslinker component (B) is chosen from tetraethylorthosilicate (TEOS), a polycondensate of TEOS, methyltrimethoxysilane (MTMS), vinyl-trimethoxysilane, methylvinyldimethoxysilane, dimethyldiethoxysilane, vinyltriethoxysilane, tetra-n-propylorthosilicate, vinyltris(methylethylketoxime)silane, methyltris(methylethylketoxime)silane, trisacetamidomethylsilane, bisacetamidodimethylsilane, tris(N-methyl-acetamido)methylsilane, bis(N-methylacetamido)dimethylsilane, (N-methyl-acetamido)methyldialkoxysilane, trisbenzamidomethylsilane, trispropenoxymethylsilane, alkyldialkoxyamidosilanes, alkylalkoxybisamidosilanes, $CH_3Si(OC_2H_5)_{1-2}(NHCOR)_{2-1}$, $(CH_3Si(OC_2H_5)(NCH_3COC_6H_5)_2$, $CH_3Si(OC_2H_5)$—$(NHCOC_6H_5)_2$, methyldimethoxy(ethylmethylketoximo)silane; methylmethoxybis-(ethylmethylketoximo)silane; methyldimethoxy(acetal-doximo)silane; methyldimethoxy(N-methylcarbamato)silane; ethyldimethoxy(N-methyl-carbamato)silane; methyldimethoxyisopropenoxysilane; trimethoxyisopropenoxysilane; methyltri-isopropenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxy-ethylaminosilane; dimethyldi-N,N-dimethylaminosilane; methyldimethoxyisopropylaminosilane dimethyldi-N,N-diethylaminosilane; ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyl dimethoxyethylacetimidatosilane; methyldimethoxy-propylacetimidatosilane; methyl dimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxy-thioisocyanatosilane; methylmethoxydithioisocyanatosilane, or a combination of two or more thereof.

According to one embodiment, the amino-containing adhesion promoter component (D) is chosen from an aminoalkyltrialkoxysilane, an aminoalkylalkyldialkoxysilane, a bis(alkyltrialkoxysilyl)amine, a tris(alkyltrialkoxysilyl)amine, or a combination of two or more thereof.

According to one embodiment, the composition comprises about 1 to about 10 wt. % of the crosslinker component (B) based on 100 wt. % of the polymer component (A).

According to one embodiment, the crosslinker component (B) is chosen from a silane or a siloxane, the silane or siloxane having two or more reactive groups that can undergo hydrolysis and/or condensation reaction with polymer (A) or on its own in the presence of water and component (F).

According to one embodiment, the polymer component (A) is chosen from a polyorganosiloxane comprising divalent units of the formula [$R_2SiO$] in the backbone, wherein R is chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof.

According to one embodiment, the polymer component (A) has the formula: $R^2_{3-a}R^1_aSi$—$Z$—$[R_2SiO]_x[R^1_2SiO]_y$—$Z$—$SiR^1_aR^2_{3-a}$ whereby x is 0 to 10000; y is 0 to 1000; a is 0 to 2; R is methyl. In another aspect, $R^1$ is chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof, and other siloxane units may be present in amounts less than 10 mol. % preferably methyl, vinyl, phenyl. In yet another embodiment, $R^2$ is chosen from OH, a $C_1$-$C_8$-alkoxy, a $C_2$-$C_{18}$-alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is —O—, bond, or —$C_2H_4$—.

According to one embodiment, the composition is provided as a one part composition.

According to one embodiment, the composition comprises 100 pt. wt of component (A), 0.1 to about 10 pt. wt of at least one crosslinker (B), 0.01 to about 7 pt. wt. of a carboxylic acid component (C), 0.1 to about 5 pt. wt. of an amino-containing adhesion promoter or a mixture of amino-containing adhesion promoters (D), 0 to 5 pt. wt. of an amino-functional siloxane (E), and 0 to about 300 pt. wt of component (F), whereby this composition can be stored in the absence of humidity and is curable in the presence of humidity upon exposure to ambient air.

According to one embodiment, the composition is a two-part composition comprising: (i) a first portion comprising the polymer component (A), and optionally the filler component (G); and (ii) a second portion comprising the crosslinker (B), the carboxylic acid component (C), a amino-containing adhesion promoter or a mixture of amino-containing adhesion promoters (D) and an amino-functional siloxane (E), whereby (i) and (ii) are stored separately until applied for curing by mixing of the components (i) and (ii).

According to one embodiment, portion (i) comprises 100% wt of component (A), and 0 to 70 pt. wt. of component (F); and portion (ii) comprises 0.1 to 10 pt. wt. of at least one crosslinker (B), 0.01 to 7 pt. wt. of a carboxylic acid component (C), 0 to 5 pt. wt. of an amino-containing adhesion promoter or a mixture of amino-containing adhesion promoters (D) and an amino-functional siloxane (E).

In another aspect, the present invention provides a method of providing a cured material comprising exposing the composition to ambient air.

According to one embodiment, a method of providing a cured material comprises combining the first portion and the second portion and curing the mixture.

According to one embodiment, the composition is stored in a sealed cartridge or flexible bag having outlet nozzles for extrusion and/or shaping of the uncured composition prior to cure.

In still another aspect, the present invention provides a cured polymer material formed from the composition.

According to one embodiment, the cured polymer material is in the form of an elastomeric or duromeric seal, an adhesive, a coating, an encapsulant, a shaped article, a mold, and an impression material.

The compositions are found to exhibit good storage stability and adhere to a variety of surfaces. In one embodiment, the curable compositions exhibit excellent adherence to thermoplastic surfaces.

DETAILED DESCRIPTION

The present invention provides a curable composition employing a non-metal based catalyst system. The curable compositions employ a catalyst system comprising a carboxylic acid component, an amino-containing silane (such as may be used as an adhesion promoter) or a mixture of amino-containing silanes and an amino-containing siloxane. The combination of the carboxylic acid component and the amino-containing silane identified in the present invention exhibit similar or superior curing properties as compared to compositions employing organotin compounds such as DBTDL or other metal-based catalysts in terms of accelerating moisture assisted condensation curing of silicones to result in cross-linked silicones, which can be used as sealants and RTVs (Room-Temperature Vulcanized Rubber). The non-toxic nature of these materials makes them more attractive and practical than organotin catalysts, given the forthcoming strict regulations on organotin catalysts.

The present invention provides a curable composition comprising a polymer component (A) comprising a reactive terminal silyl group, a cross-linker component (B), a carboxylic acid component (C), and an amino-containing silane adhesion promoter component or a mixture of amine-containing silanes (D) and an amino-containing siloxane (E). The combination of the carboxylic acid component and the amino-containing silanes/siloxanes function as a catalyst system to effect curing of the composition upon exposure to ambient air conditions. These components have been found to function as a catalyst in the absence of a metal-based catalyst such as organotin or other metal complexes that are typically used in such compositions. Thus, in one aspect, the compositions are substantially free of a metal or metal-based catalyst component as are used in moisture curable compositions. As used herein, a composition is considered to be substantially free of a metal catalyst or metal based-catalyst if it contains 0.001 pt. wt. or less of a metal catalyst or metal-based catalyst. The compositions may further include other optional components as may be used in curable compositions such as, for example, an amino-functional siloxane (E), a filler component (F), and/or auxiliary components (G). The amino-functional siloxane component (E) may be used with the carboxylic acid component (C) and the amino-containing silane component (D) to control the curing of the composition. Without being bound to any particular theory, the amino-functional siloxane component (E) may enhance the catalytic activity of the combination of the carboxylic acid component (C) and the amino-containing silane.

The polymer component (A) may be a liquid or solid-based polymer having a reactive terminal silyl group. The polymer component (A) is not particularly limited and may be chosen from any cross-linkable polymer as may be desired for a particular purpose or intended use. Non-limiting examples of suitable polymers for the polymer component (A) include polyorganosiloxanes (A1) or organic polymers free of siloxane bonds (A2), wherein the polymers (A1) and (A2) comprise reactive terminal silyl groups. In one embodiment, the polymer component (A) may be present in an amount of from about 10 to about 90 wt. % of the curable composition. In one embodiment, the curable composition comprises about 100 pt. wt. of the polymer component (A).

As described above, the polymer component (A) may include a wide range of polyorganosiloxanes. In one embodiment, the polymer component may comprise one or more polysiloxanes and copolymers of formula (2):

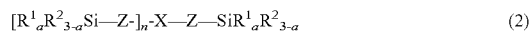
$$[R^1_a R^2_{3-a} Si\text{—}Z\text{—}]_n\text{-}X\text{—}Z\text{—}SiR^1_a R^2_{3-a} \quad (2)$$

$R^1$ may be chosen from saturated $C_1$-$C_{12}$ alkyl (which can be substituted with one or more of a halogen (e.g., Cl, F, O, S or N atom), $C_5$-$C_{16}$ cycloalkyl, $C_2$-$C_{12}$ alkenyl, $C_7$-$C_{16}$ arylalkyl, $C_7$-$C_{16}$ alkylaryl, phenyl, $C_2$-$C_4$ polyalkylene ether, or a combination of two or more thereof. Exemplary preferred groups are methyl, trifluoropropyl and/or phenyl groups.

$R^2$ may be a group reactive to protonated agents such as water and may be chosen from OH, $C_1$-$C_8$-alkoxy, $C_2$-$C_{18}$-alkoxyalkyl, amino, alkenyloxy, oximoalkyl, enoxyalkyl, aminoalkyl, carboxyalkyl, amidoalkyl, amidoaryl, carbamatoalkyl or a combination of two or more thereof. Exemplary groups for $R^2$ include OH, alkoxy, alkenyloxy, alkyloximo, alkylcarboxy, alkylamido, arylamido, or a combination of two or more thereof.

Z may be a bond, a divalent linking unit selected from the group of $O_{1/2}$, hydrocarbons which can contain one or more O, S or N atom, amide, urethane, ether, ester, urea units or a combination of two or more thereof. If the linking group Z is a hydrocarbon group then Z is linked to the silicon atom over a SiC bond. In one embodiment Z is chosen from a $C_1$-$C_{14}$ alkylene.

X is chosen from a polyurethane; a polyester; a polyether; a polycarbonate; a polyolefin; a polypropylene; a polyesterether; and a polyorganosiloxane having units of $R_3SiO_{1/2}$, $R_2SiO$, $RSiO_{3/2}$, and/or $SiO_{4/2}$, where R is chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof X may be a divalent or multivalent polymer unit selected from the group of siloxy units linked over oxygen or hydrocarbon groups to the terminal silyl group comprising the reactive group $R^2$ as described above, polyether, alkylene, isoalkylene, polyester or polyurethane units linked over hydrocarbon groups to the silicon atom comprising one or more reactive groups $R^2$ as described above. The hydrocarbon group X can contain one or more heteroatoms such as N, S, O or P forming amides, esters, ethers urethanes, esters, ureas. In one embodiment, the average polymerization degree ($P_n$) of X should be more than 6, e.g. polyorganosiloxane units of $R_3SiO_{1/2}$, $R_2SiO$, $RSiO_{3/2}$, and/or $SiO_{4/2}$. In formula (2), n is 0-100; desirably 1, and a is 0-2, desirably 0-1.

Non-limiting examples of the components for unit X include polyoxyalkylene polymers such as polyoxyethylene, polyoxypropylene, polyoxybutylene, polyoxyethylene-polyoxypropylene copolymer, polyoxytetramethylene, or polyoxypropylene-polyoxybutylene copolymer; ethylene-propylene copolymer, polyisobutylene, polychloroprene, polyisoprene, polybutadiene, copolymer of isobutylene and isoprene, copolymers of isoprene or butadiene and acrylonitrile and/or styrene, or hydrocarbon polymer such as hydrogenated polyolefin polymers produced by hydrogenating these polyolefin polymers; polyester polymer manufactured by a condensation of dibasic acid such as adipic acid or phthalic acid and glycol, polycarbonates, or ring-opening polymerization of lactones; polyacrylic acid ester produced by radical polymerization of a monomer such as $C_2$-$C_8$-alkyl acrylates, vinyl polymers, e.g., acrylic acid ester copolymer of acrylic acid ester such as ethyl acrylate or butyl acrylate and vinyl acetate, acrylonitrile, methyl methacrylate, acrylamide or styrene; graft polymer produced by polymerizing the above organic polymer with a vinyl monomer; polysulfide polymer; polyamide polymer such as Nylon 6 produced by ring-opening polymerization of ϵ-caprolactam, Nylon 6.6 produced by polycondensation of hexamethylenediamine and adipic acid, etc., Nylon 12 produced by ring-opening polymerization of ϵ-aminolauro-lactam, copolymeric polyamides, polyurethanes, or polyureas.

Particularly suitable polymers include, but are not limited to, polysiloxanes, polyoxyalkylenes, saturated hydrocarbon polymers such as polyisobutylene, hydrogenated polybutadiene and hydrogenated polyisoprene, or polyethylene, polypropylene, polyester, polycarbonates, polyurethanes, polyurea polymers and the like. Furthermore, saturated hydrocarbon polymer, polyoxyalkylene polymer and vinyl copolymer are particularly suitable due to their low glass transition temperature which provide a high flexibility at low temperatures, i.e. below 0° C.

The reactive silyl groups in formula (2) can be introduced by employing silanes containing a functional group which has the ability to react by known methods with unsaturated hydrocarbons via hydrosilylation, or reaction of SiOH, aminoalkyl, HOOC-alkyl, HO-alkyl or HO-aryl, HS-alkyl or -aryl, Cl(O)C-alkyl or -aryl, epoxyalkyl or epoxycycloalkyl groups in the prepolymer to be linked to a reactive silyl group via condensation or ring-opening reactions. Examples of the main embodiments include the following:

(i) siloxane prepolymers having a SiOH group that can undergo a condensation reaction with a silane (L-group) $SiR^1_aR^2_{3-a}$ whereby a siloxy bond $\equiv Si-O-SiR^1_aR^2_{3-a}$ is formed while the addition product of the leaving group (L-group) and hydrogen is released (L-group+H);

(ii) silanes having an unsaturated group that is capable of reacting via a hydrosilylation or a radical reaction with a SiH group or radically activated groups of a silane such as SiH or an unsaturated group; and (iii) silanes including organic or inorganic prepolymers having OH, SH, amino, epoxy, —COCl, —COOH groups, which can react complementarily with epoxy, isocyanato, OH, SH, cyanato, carboxylic halogenides, reactive alkylhalogenides, lactones, lactams, or amines, that is to link the reactive prepolymer with the organofunctional silanes to yield a silyl functional polymer.

Silanes suitable for method (i) include alkoxysilanes, especially tetraalkoxysilanes, di-and trialkoxysilanes, di-and triacetoxysilanes, di-and triketoximato-silanes, di-and trialkenyloxysilanes, di-and tricarbonamidosilanes, wherein the remaining residues at the silicon atom of the silane are substituted or unsubstituted hydrocarbons. Other non-limiting silanes for method (i) include alkyltrialkoxysilanes, such as vinyltrimethoxysilane, methyltrimethoxysilane, propyltrimethoxysilane aminoalkyltrimethoxysilane, ethyltriacetoxysilane, methyl- or propyltriacetoxysilane, methyltributanonoximosilane, methyltripropenyloxysilane, methyltribenzamidosilane, or methyltriacetamidosilane. Prepolymers suitable for reaction under method (i) are SiOH-terminated polyalkylsiloxanes, which can undergo a condensation reaction with a silane having hydrolysable groups attached to the silicon atom. Exemplary SiOH-terminated polyalkydisiloxanes include polydimethylsilaxanes.

Suitable silanes for method (ii) include alkoxysilanes, especially trialkoxysilanes (HSi(OR)$_3$) such as trimethoxysilane, triethoxysilane, methyldiethoxysilane, methyldimethoxysilane, and phenyldimethoxysilane; methyldiacetoxysilane and phenyldiacetoxysilane. Hydrogenchlorosilanes are in principle possible but are less desirable due to the additional replacement of the halogen through an alkoxy, acetoxy group, etc. Other suitable silanes include organofunctional silanes having unsaturated groups which can be activated by radicals, such as vinyl, allyl, mercaptoalkyl or acrylic groups. Non-limiting examples include vinyltrimethoxysilane, mercaptopropyltrimethoxysilane, methyacryloxypropyltrimethoxysilane. Prepolymers suitable for reaction under method (ii) include vinyl terminated polyalkylsiloxanes, preferably polydimethylsiloxanes, hydrocarbons with unsaturated groups which can undergo hydrosilylation or can undergo radically induced grafting reactions with a corresponding organofunctional group of a silane comprising an e.g. unsaturated hydrocarbon or a —SiH group.

Another method for introducing silyl groups into hydrocarbon polymers can be the copolymerization of unsaturated hydrocarbon monomers with the unsaturated groups of silanes. The introduction of unsaturated groups into a hydrocarbon prepolymer may include, for example, the use of alkenyl halogenides as chain stopper after polymerization of the silicon free hydrocarbon moiety.

Desirable reaction products between the silanes and prepolymers include the following structures:

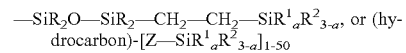

Suitable silanes for method (iii) include, but are not limited to, alkoxysilanes, especially silanes having organofunctional groups to be reactive to —OH, —SH, amino, epoxy, —COCl, or —COOH.

In one embodiment, these silanes have an isocyanatoalkyl group such as gamma-isocyanatopropyltrimethoxysilane, gamma-isocyanatopropylmethyldimethoxysilane, gamma-isocyanatopropyltriethoxysilane, gamma-glycidoxypropylethyldimethoxysilane, gamma-glycidoxypropyltrimethoxysilane, gamma-glycidoxypropyltrimethoxysilane, gamma-(3,4-epoxycyclohexyl)ethyltrimethoxysilane, epoxylimonyltrimethoxysilane, N-(2-aminoethyl)-aminopropyltrimethoxysilane gamma-aminopropyltriethoxysilane, gamma-aminopropyltrimethoxysilane, gamma-aminopropylmethyldimethoxysilane, gamma-aminopropylmethyldiethoxysilane and the like.

In one embodiment, it is desirable to select either blocked amines or isocyanates (Z'—X)$_n$—Z' for carrying out first a complete mixing and then the following coupling reaction. Examples of blocking agents are disclosed in EP 0947531 and other blocking procedures that employ heterocyclic nitrogen compounds such as caprolactam or butanone oxime, or cyclic ketones referred to in U.S. Pat. No. 6,827,875 both of which are incorporated herein by reference in their entirety.

Examples of suitable prepolymers for a reaction under method (iii) include, but are not limited to, polyalkylene oxides having OH groups, preferably with a high molecular weight (Mw) (weight average molecular weight >6000 g/mol) and a polydispersity Mw/Mn of less than 1.6; urethanes having remaining NCO groups, such as NCO functionalized polyalkylene oxides, especially blocked isocyanates. Prepolymers selected from the group of hydrocarbons having —OH, —COOH, amino, epoxy groups, which can react complementarily with an epoxy, isocyanato, amino, carboxyhalogenide or halogenalkyl group of the corresponding silane having further reactive groups useful for the final cure.

Suitable isocyanates for the introduction of a NCO group into a polyether may include tolulene diisocyanate, diphenylmethane diisocyanate, or xylene diisocyanate, or aliphatic polyisocyanate such as isophorone diisocyanate, or hexamethylene diisocyanate.

The polymerization degree of the unit X depends on the requirements of viscosity and mechanical properties of the cured product. If X is a polydimethylsiloxane unit, the average polymerization degree based on the number average molecular weight Mn is preferably 7 to 5000 siloxy units, preferably 200-2000 units. In order to achieve a sufficient tensile strength of >5 MPa, an average polymerization degree Pn of >250 is suitable whereby the polydimethylsiloxanes have a viscosity of more than 1000 mPa·s at 25° C. If X is a hydrocarbon unit other than a polysiloxane unit the viscosity with respect to the polymerization degree is much higher.

Examples of the method for synthesizing a polyoxyalkylene polymer include, but are not limited to, a polymerization method using an alkali catalyst such as KOH, a polymerization method using a transition metal compound porphyrin complex catalyst such as complex obtained by reacting an organoaluminum compound, a polymerization method using a composite metal cyanide complex catalyst disclosed, e.g., in U.S. Pat. Nos. 3,427,256; 3,427,334; 3,278,457; 3,278,458; 3,278,459; 3,427,335; 6,696,383; and 6,919,293.

If the group X is selected from hydrocarbon polymers, then polymers or copolymers having isobutylene units are particularly desirable due to its physical properties such as excellent weatherability, excellent heat resistance, and low gas and moisture permeability.

Examples of the monomers include olefins having 4 to 12 carbon atoms, vinyl ether, aromatic vinyl compound, vinylsilanes, and allylsilanes. Examples of the copolymer component include 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, α-methylstyrene, dimethylstyrene, β-pinene, indene, and for example but not limited to vinyltrialkoxysilanes, e.g. vinyltrimethoxysilane, vinylmethyldichlorosilane, vinyldimethylmethoxysilane, divinyldichlorosilane, divinyldimethoxysilane, allyltrichlorosilane, allylmethyldichlorosilane, allyldimethylmethoxysilane, diallyldichlorosilane, diallyldimethoxysilane, gamma-methacryloyloxypropyltrimethoxysilane, and gamma-methacryloyloxy-propyl-methyldimethoxysilane.

In one embodiment, the polymer component (A) may be a polymer of formula (3):

$$R^2{}_{3-a}R^1{}_a Si-Z-[R_2SiO]_x[R^1{}_2SiO]_y-Z-SiR^1{}_a R^2{}_{3-a} \quad (3)$$

where $R^1$, $R^2$, and Z are defined as above with respect to formula (2); R is $C_1-C_6$-alkyl (an exemplary alkyl being methyl); a is 0-2, x is 0 to about 10,000; preferably 11 to about 2500; and y is 0 to about 1,000; preferably 0 to 500. In one embodiment, Z in a compound of formula (3) is a bond or a divalent $C_2$ to $C_{14}$-alkylene group, especially preferred is —$C_2H_4$—.

Non-limiting examples of suitable polysiloxane-containing polymers (A1) include, for example, silanol-stopped polydimethylsiloxane, silanol or alkoxy-stopped polyorganosiloxanes, e.g., methoxystopped polydimethylsiloxane, alkoxy-stopped polydimethylsiloxane-polydiphenylsiloxane copolymer, and silanol or alkoxy-stopped fluoroalkyl-substituted siloxanes such as poly(methyl 3,3,3-trifluoropropyl)siloxane and poly(methyl 3,3,3-trifluoropropyl)siloxane-polydimethyl siloxane copolymer. The polyorganosiloxane component (A1) may be present in an amount of about 10 to about 90 wt. % of the composition or 100 pt. wt. In one preferred embodiment, the polyorganosiloxane component has an average chain length in the range of about 10 to about 2500 siloxy units, and the viscosity is in the range of about 1 to about 500,000 mPa·s at 25 C.

Alternatively, the composition may include silyl-terminated organic polymers (A2) that are free of siloxane units, and which undergo curing by a condensation reaction comparable to that of siloxane containing polymers (A1). Similar to the polyorganosiloxane polymer (A1), the organic polymers (A2) that are suitable as the polymer component (A) include a terminal silyl group. In one embodiment, the terminal silyl group may be of the formula (4):

$$-SiR^1{}_a R^2{}_{3-a} \quad (4)$$

where $R^1$, $R^2$, and a are as defined above.

Examples of suitable siloxane free organic polymers include, but are not limited to, silylated polyurethane (SPUR), silylated polyester, silylated polyether, silylated polycarbonate, silylated polyolefins like polyethylene, polypropylene, silylated polyesterether and combinations of two or more thereof. The siloxane-free organic polymer may be present in an amount of from about 10 to about 90 wt. % of the composition or about 100 pt. wt.

In one embodiment, the polymer component (A) may be silylated polyurethane (SPUR). Such moisture curable compounds are known in the art in general can be obtained by various methods including (i) reacting an isocyanate-terminated polyurethane (PUR) prepolymer with a suitable silane, e.g., one possessing both hydrolyzable functionality at the silicon atom, such as, alkoxy etc., and secondly active hydrogen-containing functionality such as mercaptan, primary or secondary amine, preferably the latter, etc., or by (ii) reacting a hydroxyl-terminated PUR (polyurethane) prepolymer with a suitable isocyanate-terminated silane, e.g., one possessing one to three alkoxy groups. The details of these reactions, and those for preparing the isocyanate-terminated and hydroxyl-terminated PUR prepolymers employed therein can be found in, amongst others: U.S. Pat. Nos. 4,985,491; 5,919,888; 6,207,794; 6,303,731; 6,359,101; and 6,515,164 and published U.S. Patent Application Nos. 2004/0122253 and US 2005/0020706 (isocyanate-terminated PUR prepolymers); U.S. Pat. Nos. 3,786,081 and 4,481,367 (hydroxyl-terminated PUR prepolymers); U.S. Pat. Nos. 3,627,722; 3,632,557; 3,971,751; 5,623,044; 5,852,137; 6,197,912; and 6,310,170 (moisture-curable SPUR (silane modified/terminated polyurethane) obtained from reaction of isocyanate-terminated PUR prepolymer and reactive silane, e.g., aminoalkoxysilane); and, U.S. Pat. Nos. 4,345,053; 4,625,012; 6,833,423; and published U.S. Patent Application 2002/0198352 (moisture-curable SPUR obtained from reaction of hydroxyl-terminated PUR prepolymer and isocyanatosilane). The entire contents of the foregoing U.S. patent documents are incorporated by reference herein. Other examples of moisture curable SPUR materials include those described in U.S. Pat. No. 7,569,653, the disclosure of which is incorporated by reference in its entirety.

The polysiloxane composition may further include a crosslinker or a chain extender as component (B). In one embodiment, the crosslinker is of the formula (5):

$$R^1{}_a SiR^2{}_{4-a} \quad (5)$$

wherein $R^2$ may be as described above, R' may be as described above, and a is 0-3. Alternatively, the cross-linker component may be a condensation product of formula (5) wherein one or more but not all $R^2$ groups are hydrolyzed and released in the presence of water and then intermediate silanols undergo a condensation reaction to give a Si—O—Si bond and water. The average polymerization degree can result in a compound having 2-10 Si units.

As used herein, the term crosslinker includes a compound including an additional reactive component having at least 2 hydrolysable groups and less than 3 silicon atoms per molecule not defined under (A). In one embodiment, the crosslinker or chain extender may be chosen from an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, an imidatosilane, a ureidosilane, an isocyanatosilane, a thioisocyanatosilane, and combinations of two or more thereof. Examples of suitable cross-linkers include, but are not limited to, tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoxime)silane; vinyltris(methylethylketoxime)silane; 3,3,3-trifluoropropyltris(methylethylketoxime)silane; methyltris(isopropenoxy)silane; vinyltris(isopropenoxy)silane; ethylpolysilicate; dimethyltetraacetoxydisiloxane; tetra-n-propylorthosilicate; methyldimethoxy(ethylmethylketoximo)silane; methylmethoxybis-(ethylmethylketoximo)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisopropenoxysilane; methyltri-iso-propenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane dimethyldi-N,N-diethylaminosilane. ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxythioisocyanatosilane; methylmethoxydithioisocyanatosilane, or combinations of two or more thereof. The crosslinker may be present in an amount from about 1 to about 10 wt. % of the composition or from about 0.1 to about 10 pt. wt. per 100 pt. wt. of the polymer component (A).

Additional alkoxysilanes in an amount greater than 0.1 wt. % of component and (A) that are not consumed by the reaction between the prepolymer Z'—X—Z' and which comprise additional functional groups selected from $R^4$ can also work as adhesion promoter and are defined and counted under component (D).

The composition employs a carboxylic acid component (C), an amino-containing silane or a mixture of amino-containing silanes (D), and optionally an amino-containing siloxane component (E). The combination of these components has been found to act as a catalyst to catalyze the curing of the composition upon exposure to ambient air conditions. The components (C), (D), and (E) may therefore be collectively viewed as part of a catalyst system.

The carboxylic acid component may be chosen from any suitable carboxylic acid component. In one embodiment, the carboxylic acid component may be chosen from an aliphatic carboxylic acid. Suitable carboxylic acids for the carboxylic acid component (C) include, but are not limited to, a branched alkyl $C_4$-$C_{30}$-alkyl carboxylic acid, including $C_5$-$C_{30}$, even $C_5$-$C_{19}$ acids with alpha tertiary carbon, or a combination of two or more thereof. Some useful carboxylic acids that can be utilized herein include, but are not limited to, propanoic acid, 2-methyl propanoic acid, butanoic acid, pentanoic acid (valeric acid), hexanoic acid (caproic acid), 2-ethylhexanoic acid, heptanoic acid (enanthic acid), hexanoic acid, octanoic acid (caprylic acid), oleic acid, linoleic acid, linolenic acid, cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, Versatic™ Acid (available from Momentive), etc., or a combination of two or more thereof. In one embodiment, the acidic compound may be a mixture comprising branched alkyl carboxylic acids. In one embodiment, the acidic compound is a mixture of mainly tertiary aliphatic $C_{10}$ carboxylic acids.

In one embodiment, the carboxylic acid component (C) may be added to the composition in an amount of from about 0.01 to about 7.0 pt. wt. related to 100 part per weight of component (A) from about 0.1 to about 5.0 pt. wt.; even from about 0.5 to about 2.0 pt. wt. In another embodiment the carboxylic acid component (C) may be added in an amount of from about 0.1 to about 1.0 pt. wt. In still another embodiment, the carboxylic acid component (C) may be added in an amount of from about 0.2 to about 0.4 pt. wt. An increase in the amount of carboxylic acid component complex as a catalyst may increase the rate of the surface cure time and the bulk or complete cure time for the composition. Furthermore, the amount of the carboxylic acid component complex added to the composition may affect the viscosity of the composition. Particularly, an increase in the amount of the carboxylic acid component may increase the final viscosity of the composition.

The composition further includes an amino-containing adhesion promoter component (D) that is different to component (A) or (B). The amino group-containing silane adhesion promoter agent (D) is a compound having a group containing a silicon atom bonded to a hydrolyzable group (hereinafter referred to as a hydrolyzable group attached to the silicon atom) and an amino group. Specific examples thereof include the same silyl groups with hydrolyzable groups described above. Among these groups, the methoxy group and ethoxy group are particularly suitable. The number of the hydrolyzable groups may be 2 or more, and particularly suitable are compounds having 3 or more hydrolzable groups. In one embodiment, the adhesion promoter (D) may be an organofunctional silane comprising the group $R^4$, e.g., aminosilanes, and other silanes that are not identical to the silanes of component (B), or are present in an amount which exceeds the amount of silanes necessary for endcapping the polymer (A). The amount of non-reacted silane (B) or (D) in the reaction for making (A) can be defined in that after the endcapping reaction the free silanes are evaporated at a higher temperature up to 200° C. and vacuum up to 1 mbar to be more than 0.1 wt. % of (A).

In one embodiment, the amino-containing adhesion promoter (D) may be described by the general formula (6):

$$R^4_e R^1_d Si(OR^3)_{4-d-e} \quad (6)$$

where $R^4$ is E-$(CR^5_2)_f$—W—$(CH_2)_f$—; $R^1$ is as described above; d is 0, 1 or 2; e=1, 2 or 3; d+e =1 to 2; and f is 0 to 8, and may be identical or different, and E may be $E^1$ or $E^2$ as described herein. Non-limiting examples of suitable compounds include:

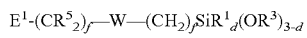
(6a), or (6d)

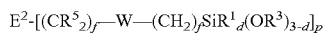
(6b) or (6f)

where p=2-3.

The group E may be selected from either a group $E^1$ or $E^2$. $E^1$ may be selected from a monovalent group comprising amine, —$NH_2$, —NHR, —$(NHC_2H_5)_{1-10}NHR$, and $NHC_6H_5$. $E^2$ may be selected from a group comprising of a di- or multivalent group consisting of amine and polyamine. W may be selected from the group consisting of a single bond, a heteroatomic group selected from —COO—, —O—, epoxy, —S—, —CONH—, —HN—CO—NH— units $R^5$ may be selected from hydrogen and R as defined above. R' may be identical or different as defined above. $R^3$ may be selected from a $C_1$-$C_8$-alkoxy, such as methoxy, ethoxy, a $C_3$-$C_{12}$-alkoxyalkyl, a $C_2$-$C_{22}$-alkylcarboxy, and a $C_4$-$C_{100}$-polyalkylene oxide, which may be identical or different.

Non-limiting examples of the amino-containing component (D) include:

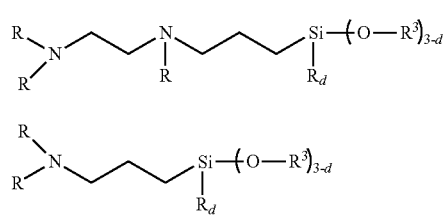
(6c)

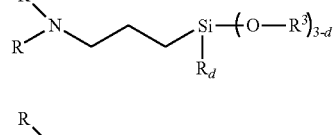
(6d)

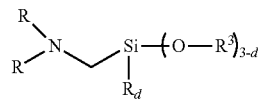
(6e)

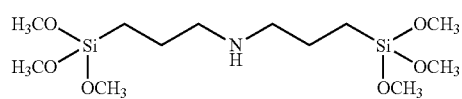
(6f)

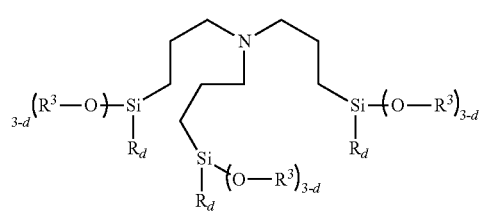
(6g)

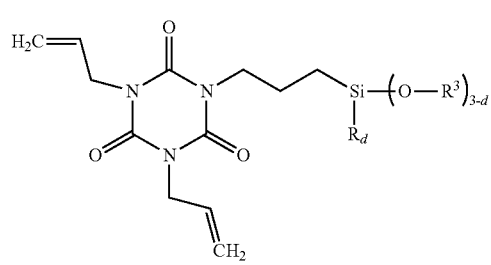
(6h)

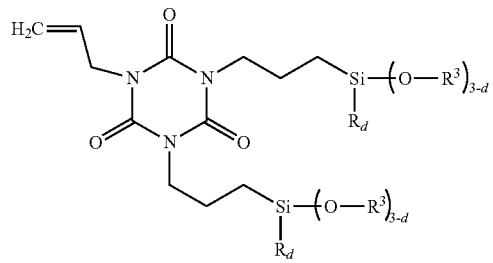
(6i)

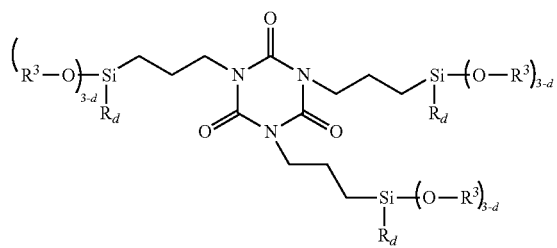
(6j)

wherein R and d are as defined above. Examples of component (D) include compounds of the formulas (6a-6k). Furthermore the formula (6b) of compounds (D) shall comprise compounds of the formula (6k):

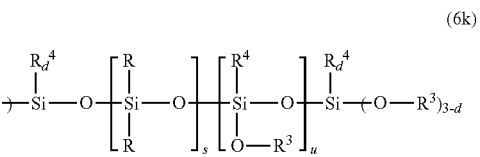
(6k)

wherein: R, $R^1$, $R^3$, and $R^4$ are as defined above providing $R^4$ is an amino-containing compound; $R^6$ is hydrogen, R, linear and branched $C_3$-$C_{16}$ alkyl, $C_5$-$C_{14}$ cycloalkyl, phenyl, and phenyl substituted with $C_1$-$C_8$ alkyl; s is 0-6 (and in one embodiment desirably 0); u is 0-10 (in one embodiment desirably 0-5); and s+u is 10 or less. In one embodiment, $R^4$ is selected from:

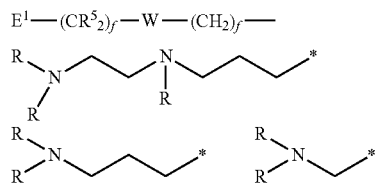

Examples of other suitable adhesion promoter (D) include, but are not limited to N-(2-aminoethyl)aminopropyltrimethoxysilane gamma-aminopropyltriethoxysilane, gamma-aminopropyltrimethoxysilane, bis(gamma-trimethoxysilypropyl)amine, N-phenyl-gamma-aminopropyltrimethoxysilane, triaminofunctionaltrimethoxysilane, gamma-aminopropylmethyldimethoxysilane, gamma-aminopropylmethyldiethoxysilane, omega-bis-(aminoalkyl-diethoxysilyl)-polydimethylsiloxanes (Pn=1-7), alpha, omega-bis-(aminoalkyl-diethoxysilyl)-octa-methyltetrasiloxane, 4-amino-3,3,-dimethyl-butyl-tri-methoxysilane, and N-ethyl-3-tri-methoxy-silyl-2- methylpropanamine, 3-(diethyl-aminopropyl)-trimethoxysilane combinations of two or more thereof, and the like. Particularly suitable amino-containing adhesion promoters include bis(alkyltrialkoxysilyl)amines and tris (alkyltrialkoxysilyl)amines including, but not limited to, bis(3-propyltrimethoxysilyl)amine and tris(3-propyltrimethoxysilyl)amine.

Also it is possible to use derivatives obtained by modifying them, for example, amino-modified silyl polymer, silylated amino polymer, unsaturated aminosilane complex, phenylamino long-chain alkyl silane and aminosilylated silicone. These amino group-containing silane coupling agents may be used alone, or two or more kinds of them may be used in combination.

The amino-containing adhesion promoter (D) may be present in an amount of from about 0.1 to about 5.0 pt. wt. based on 100 parts of the polymer component (A). In one embodiment, the amino-containing adhesion promoter may be present in an amount of from about 0.15 to about 2.0 pt. wt. In another embodiment, the amino-containing adhesion promoter may be present in an amount of from about 0.5 to about 1.5 pt. wt of the polymer component (A). This defines the amount of (D) in composition of (A) wherein the content of free silanes coming from the endcapping of polymer (A) is smaller than 0.1 wt. %.

In one embodiment, the composition may optionally comprise an amino-functional siloxane component (E). Without being bound to any particular theory, the amino-functional silicone may further enhance the catalytic activity of the combination of the carboxylic acid component and the amino-containing adhesion promoter. The composition may comprise from about 0 to about 5 pt. wt. of amino-functional siloxane component (E) per 100 pt. wt of component (A). In one embodiment, the composition may comprise from about 0.1 to about 5 pt. wt. of amino-functional siloxane component (E) per 100 pt. wt of component (A). In one embodiment, the composition may comprise from about 0.1 to about 2 pt. wt. of amino-functional siloxane component (E) per 100 pt. wt of component (A). In another embodiment, the composition may comprise from about 0.2 to about 1 pt. wt. of amino-functional siloxane component (E) per 100 pt. wt of component (A). In another embodiment, the composition may comprise from about 0.3 to about 0.8 pt. wt. of amino-functional siloxane component (E) per 100 pt. wt of component (A).

Amino-functional siloxaness useful in the present invention include silicone polymers that contain primary, secondary, or tertiary amino functional groups. In one embodiment, the amino-functional silicones are copolymers of dialkylsiloxane and amino-functional siloxane comonomers. The amino-functional silicones may contain about 1 to about 50 mole percent of amino-functional siloxane comonomer units, desirably about 1 to about 30 mole percent of amino-functional siloxane comonomer units. These silicone fluids may contain starting materials and reaction by-products in addition to the amino-functional dialkylpolysiloxane.

Suitable amino-functional silicones include those disclosed in U.S. Pat. No. 4,665,116, the pertinent disclosure of which are incorporated herein by reference. Examples of suitable amino-functional silicones include (2-aminoethyl) methylpolysiloxane, (3-aminopropyl)methylpolysiloxane, (2-aminoethyl-3-aminopropyl)methylpolysiloxane, (3-(2-aminoethyoxy)propyl)methylpolysiloxane, (6-aminohexyl) methylpolysiloxane, (3-(2-aminoethoxy)propyl)methylpolysiloxane, (3-(2-aminoethylamino)propyl)methylsiloxane, dimethylsiloxane copolymers thereof, and the like. Useful amino-functional dialkylpolysiloxanes and methods for preparing them are described in U.S. Pat. Nos. 3,890,269, 3,960,575 and 4,247,330 whose pertinent disclosures are incorporated herein by reference.

A particularly suitable amino-functional polydimethylsiloxane is commercially available under the designation SF-1706 from Momentive, and is a mixture of aminoethyl-aminopropylpolysiloxane and methoxy-terminated dimethylsiloxane polymers having according to the manufacturer's Material Safety Data Sheet (MSDS) for the product. Other suitable amino-functional silicones are available from Momentive Performance Materials and OSi Specialties, Inc. of Danbury, Conn.

Optionally, the composition may further comprise an adhesion promoter different from the amino-containing adhesion promoter component (D) described above. Such other adhesion promoters may include those described by formulas (6), (6a), and (6b) as previously described where E may be $E^1$ or $E^2$. In these other adhesion promoters, $E^1$ may be selected from halogen, pseudohalogen, unsaturated aliphatic group with up to 14 carbon atoms, epoxy-group-containing aliphatic group with up to 14 carbon atoms, cyanurate-containing group, and an isocyanurate-containing group. $E^2$ may be selected from a group comprising of a di- or multivalent group consisting of isocyanurate-containing and an isocyanurate-containing group, sulfide, sulfate, phosphate, phosphite and a polyorganosiloxane group, which can contain $R^4$ and $OR^3$ groups. W may be as described above with respect to the adhesion promoter component (D).

Examples of suitable adhesion promoters include methacryloxypropyltrimethoxysilane, methylaminopropyltrimethoxysilane, gamma-glycidoxypropylethyldimethoxysilane, gamma-glycidoxypropyltrimethoxysilane, gamma-glycidoxyethyltrimethoxysilane, gamma-(3,4-epoxycyclohexyl)ethyltrimethoxysilane, beta-(3,4-epoxycyclohexyl)ethylmethyl-dimethoxysilane, epoxylimonyltrimethoxysilane, isocyanatopropyltriethoxysilane, isocyanatopropyltrimethoxysilane, isocyanatopropylmethyldimethoxysilane, beta-cyano-ethyl-trimethoxysilane, gamma-acryloxypropyl-trimethoxy-silane, gamma-methacryloxypropyl-methyldimethoxysilane, alpha, or a combination of two or more thereof.

The present compositions may further include a filler component (F). The filler component(s) (F) may have different functions, such as to be used as reinforcing or semi-reinforcing filler, i.e., to achieve higher tensile strength after curing having in addition the ability to increase the viscosity establish pseudoplasticity/shear thinning, and thixotropic behavior as well as non-reinforcing fillers acting mainly as a volume extender. The reinforcing fillers are characterized by having a specific surface area of more than 50 m²/g related BET-surface, whereby the semi-reinforcing fillers have a specific surface area in the range of 10-50 m²/g. So-called extending fillers have preferably a specific surface of less than 10 m²/g according to the BET-method and an average particle diameter below 100 nm. In one embodiment of the semi-reinforcing filler is a calcium carbonate filler, the reinforcing filler is a silica filler, or a mixture thereof. Examples of suitable reinforcing fillers include, but are not limited to fumed silicas or precipitated silica, which can be partially or completely treated with organosilanes or siloxanes to make them less hydrophilic and decrease the water content or control the viscosity and storage stability of the composition. These fillers are named hydrophobic fillers. Non-limiting examples of suitable fillers include those sold under the tradenames are Aerosil®, HDK®, Cab-O-Sil® etc.

Examples of suitable extending fillers include, but are not limited to, ground silicas (Celite™), precipitated and colloidal calcium carbonates (which are optionally treated with compounds such as stearate or stearic acid); reinforcing silicas such as fumed silicas, precipitated silicas, silica gels and hydrophobized silicas and silica gels; crushed and ground quartz, cristobalite, alumina, aluminum hydroxide, titanium dioxide, zinc oxide, diatomaceous earth, iron oxide, carbon black, powdered thermoplastics such as acrylonitrile, polyethylene, polypropylene, polytetrafluoroethylene and graphite or clays such as kaolin, bentonite or montmorillonite (treated/untreated), and the like.

The type and amount of filler added depends upon the desired physical properties for the cured silicone/non-silicone composition. As such, the filler may be a single species or a mixture of two or more species. The extending fillers can be present from about 0 to about 300 wt. % of the composition related to 100 parts of component (A). The reinforcing fillers can be present from about 5 to about 60 wt. % of the composition related to 100 parts of component (A), preferably 5 to 30 wt. %.

The curable composition may also include auxiliary substances (G) such as plasticizers, pigments, stabilizers, antimicrobial or fungicides, biocides and/or solvents. Preferred plasticizers for reactive polyorganosiloxanes (A) are selected from the group of polyorganosiloxanes having chain length of 10-300 siloxy units. Preferred are trimethylsilyl terminated polydimethylsiloxanes having a viscosity of 100-1000 mPa·s at 25° C. Water can be an additional component (G) to accelerate fast curing 2 part compositions RTV 2-K, whereby the water can be in one part of the 2 compositions.

In one embodiment, a composition in accordance with the present invention comprises: 100 pt.wt. polymer component (A); about 0.1 to about 10 pt. wt crosslinker component (B); about 0.01 to about 7 pt. wt carboxylic acid component (C); about 0.1 to about 5, in one embodiment 0.15-1 pt. wt, of an amino-containing adhesion promoter component (D); 0 to 5 pt. wt. amino-functional siloxane (E); about 0 to about 300 pt. wt filler component (F); optionally 0 to about 15 pt. wt component (G), where the pt. wt. of components (B)-(G) are each based on 100 parts of the polymer component (A).

It will be appreciated that the curable compositions may be provided as either a one-part composition or a two-part composition. A one-part composition refers to a composition comprising a mixture of the various components described above. A two-part composition may comprise a first portion and a second portion that are separately stored and subsequently mixed together just prior to application for curing. In one embodiment, a two-part composition comprises a first portion (P1) comprising a polymer component (A) and filler (F) and a second portion (P2), comprising a crosslinker component (B), the carboxylic acid component (C). The first and second portions may include other components such as (G) as may be desired for a particular purpose or intended use. For example, in one embodiment, the first portion (P1) may optionally comprise an amino-containing adhesion promoter (D), optionally an amino-functional silicone, and/or a filler (E), and the second portion (P2) may optionally comprise auxiliary substances (G), and water.

In one embodiment, a two-part composition comprises (i) a first portion comprising the polymer component (A) and optionally the filler component (F); and (ii) a second portion comprising the crosslinker (B), the carboxylic acid component (C), the amino-containing adhesion promoter or a mixture of amino-containing adhesion promoters (D), and optionally the amino-functional siloxane (E), where portions (i) and (ii) are stored separately until applied for curing by mixing of the components (i) and (ii).

The curable compositions may be used in a wide range of applications including as materials for sealing, mold making, adhesives, coatings in sanitary rooms, glazing, prototyping, joint seal between different materials, e.g. sealants between ceramic or mineral surfaces and thermoplastics, paper release, impregnation, and the like. A curable composition in accordance with the present invention comprising a combination of carboxylic acid and an amino-containing adhesion promoter as a catalyst may be suitable for a wide variety of applications such as, for example, a general purpose and industrial sealant, potting compound, caulk, adhesive or coating for construction use, insulated glass (IG), structural glazing (SSG), where glass sheets are fixed and sealed in metal frame; caulks, adhesives for metal plates, car bodies, vehicles, electronic devices and the like. Furthermore, the present composition may be used either as a one-part RTV-1K or as a two-part room temperature vulcanizing (RTV-2K) formulation which can adhere onto broad variety of metal, mineral, ceramic, rubber or plastic surfaces.

Curable compositions comprising the non-metal catalyst system comprising a carboxylic acid and an amino-containing adhesion promoter may be further understood with reference to the following Examples.

EXAMPLES

General Experimental Procedure for "Two-Part" Composition with Carboxylic Acid Catalyst To a mixture of 1 g of ethyl polysilicate (EPS), 0.5 g aminosilane, and carboxylic acid catalyst (0.04 g) (Part-2), 99.66 g of a mixture of silanol-stopped PDMS and silica filler (Part-1) was added and mixed using a Hauschild mixer for 1.5 min. The mixed formulation was poured into a Teflon mold (length×breadth×depth~10 cm×10 cm×1 cm) placed inside a fume hood. The surface curing (TFT) and bulk curing was monitored as a function of time (maximum of 7 days)

Measurement of Surface Curing (TFT) and Bulk Curing

The surface cure was denoted by tack free time (TFT). In a typical TFT measurement, a stainless steel (SS) weight (weighing~10 g) was placed on the surface of the formulation spread on the Teflon mold to infer the tackiness of the surface as whether any material is adhered to the surface of the SS weight or not. TFT is defined as the time taken for getting a non-tacky surface. Bulk curing is the time taken for complete curing of formulation throughout the thickness (i.e. Top to bottom) and it is monitored as a function of time (visual inspection) till 7 days. Table 1 compares the properties of TFT and bulk cure properties of composition comprising Versatic acid with and without amino-silanes.

TABLE 1

| Formulations | Comp Ex-1 (C1) | Comp Ex-2 (C2) | Comp Ex-3 (C3) | Comp Ex-4 (C4) | Working Ex-1 | Working Ex-2 |
|---|---|---|---|---|---|---|
| Component A | | | | | | |
| OH-end capped PDMS 4 Pa·s | 66.33 | 66.33 | 66.33 | 66.33 | 66.33 | 66.33 |
| Silica | 33.33 | 33.33 | 33.33 | 33.33 | 33.33 | 33.33 |
| Component B | | | | | | |
| Ethyl polysilicate | 1 | 1 | 1 | 1 | 1 | 1 |
| Bis (3-propyltrimethoxysilyl) amine | 0.5 | | 0.5 | | 0.5 | |
| N-β (Aminoethyl)-3-aminopropyl-trimethoxysilane | | 0.5 | | | | 0.5 |
| Dibutyltin dilaurate | 0.1 | 0.1 | | | | |
| Versatic acid 10 | | | | 0.2 | 0.2 | 0.2 |
| Properties | | | | | | |
| Tack-free time (min) - immediately after mixing comp A & B | 13 | 11 | 79 | >48 hours | 15 | 35 |
| Bulk cure time (h) - immediately after mixing comp A & B | 6 | 6 | 24 | Did not cure | 5 | 5 |
| Shore-A hardness (top/bottom) - immediately after mixing comp A & B | 58/60 | 50/55 | 55/58 | Did not cure | 46/47 | 44/46 |

Measurement of the Storage Stability

For aging studies, the pre-mixed mixture containing ethyl polysilicate (EPS), aminosilane, carboxylic acid catalyst, and cure accelerator or storage stabilizer were kept in an oven for (1) 4 hours at 50° C., or (2) 5 days at 70° C., after which specified period the mixture is removed from oven and allow it to attain RT. Further mixture is mixed with a mixture of silanol stopped silicone and silica filler using Hauschild mixer for 1.5 min. The mixed formulation was poured into a Teflon mold (length×breadth×depth~10 cm×10 cm×1 cm) placed inside a fume hood. The surface curing (TFT) and bulk curing was monitored as a function of time (maximum of 7 days) and Shore A hardness in order to determine, to what extent the compositions maintained performance after storage under accelerated conditions. The increased temperature for the storage test should simulate the storage effect at room temperature (25° C., 50% relative humidity) over longer times in a kind of time lapse. Tables 2 and 3 compare the properties of compositions using a Versatic acid & amino-silane and aminosiloxane based catalysts.

TABLE 2

| Formulations | Comp Ex-5 (C5) | Comp Ex-6 (C6) | Working Ex-3 | Working Ex-4 | Working Ex-5 | Working Ex-6 | Working Ex-7 |
|---|---|---|---|---|---|---|---|
| Component A | | | | | | | |
| OH-end capped PDMS 4 Pa·s | 66.33 | 66.33 | 66.33 | 66.33 | 66.33 | 66.33 | 66.33 |
| Silica | 33.33 | 33.33 | 33.33 | 33.33 | 33.33 | 33.33 | 33.33 |
| Component B | | | | | | | |
| Ethyl polysilicate | 1 | 1 | 1 | 1 | 1 | 1 | 1 |
| Dibutyltin dilaurate | 0.1 | 0.1 | | | | | |
| Versatic acid 10 | | 0.03 | 0.03 | 0.03 | 0.030 | 0.03 | 0.03 |
| N-β (Aminoethyl)-3-aminopropyl-trimethoxysilane | | 0.5 | | 0.5 | | 0.5 | 0.5 |
| Bis (3-propyltrimethoxysilyl) amine | 0.5 | | 0.5 | | 0.5 | | 0.5 |
| Amino-functional silicone | | | | | 0.5 | 0.5 | 0.5 |
| Properties | | | | | | | |
| Tack-free time (min) - immediately after mixing comp A & B | 14 | 12 | 36 | 63 | 80 | 55 | 16 |
| Bulk cure time (h) - immediately after mixing comp A & B | 6 | 6 | 6 | 6 | 10 | 8 | 6 |

TABLE 2-continued

| Formulations | Comp Ex-5 (C5) | Comp Ex-6 (C6) | Working Ex-3 | Working Ex-4 | Working Ex-5 | Working Ex-6 | Working Ex-7 |
|---|---|---|---|---|---|---|---|
| Shore-A hardness (top/bottom) - immediately after mixing comp A & B | 52/50 | 42/45 | 56/56 | 45/48 | 55/56 | 42/45 | 62/62 |
| Tack-free time (min) - after ageing at 70° C. for 5 days | 20 | 15 | 62 | 70 | 65 | 23 | 21 |
| Bulk cure time (h) - after ageing at 70° C. for 5 days | 6 | 6 | 7 | 7 | 10 | 8 | 6 |
| Adhesion to polyvinylchloride | x | x | x | NA | NA | + | + |
| Adhesion to Glass | x | x | + | NA | NA | + | + |
| Adhesion to polycarbonate | x | x | x | NA | NA | + | + |
| Adhesion to Aluminum | x | x | + | NA | NA | + | + |

NA—Not Applicable
x—No adhesion
+—Good adhesion

TABLE 3

| Formulations | Comp Ex-7 | Working Ex-8 | Working Ex-9 | Working Ex-10 | Working Ex-11 | Working Ex-12 |
|---|---|---|---|---|---|---|
| Component A | | | | | | |
| OH-end capped PDMS 4 Pa·s | 66.33 | 66.33 | 66.33 | 66.33 | 66.33 | 66.33 |
| Silica | 33.33 | 33.33 | 33.33 | 33.33 | 33.33 | 33.33 |
| Component B | | | | | | |
| Ethyl Polysilicate | 1 | 1 | 1 | 1 | 1 | 1 |
| Dibutyltin dilaurate | 0.1 | | | | | |
| N-β (Aminoethyl)-3-aminopropyl-trimethoxysilane | | 0.5 | 0.5 | 0.5 | 1.5 | 0.5 |
| Bis (3-propyltrimethoxysilyl) amine | 0.5 | 0.5 | 0.5 | 0.5 | 0.5 | 0.5 |
| Tris [(3-trimethoxylsilyl)propyl] isocyanurate | | | | | | 0.5 |
| Amino-functional silicone | | 0.5 | 0.5 | 0.5 | 0.5 | 0.5 |
| Versatic acid 1532 | | | 0.03 | | | |
| Versatic acid 1531 | | | | 0.03 | | |
| Versatic acid 10 | | 0.03 | | | 0.03 | 0.03 |
| Properties (50° C. @ 4 hours) | | | | | | |
| Observation | | clear | clear | clear | turbid | turbid |
| TFT (min) | 20 | 21 | 21 | 22 | 19 | 22 |
| Bulk cure time (h) | 16 | 16 | 20 | 20 | <48 | 16 |
| Hardness | | | | | | |
| After 21 hours | 30/17 | 39/18 | 40 | 41 | 10 | 40 |
| After 2 days | NT | NT | NT | NT | NT | NT |
| After 3 days | 43/40 | 45/42 | 45/28 | 42/40 | 42/3 | 50/42 |
| Adhesion | | | | | | |
| Copper | ○ | ○ | ○ | ○ | ○ | ○ |
| Aluminum | ○ | ○ | ○ | ○ | ○ | ○ |
| Glass | ○ | ○ | ○ | ○ | ○ | ○ |
| Epoxy glass | ○ | ○ | ○ | ○ | ○ | ○ |
| Polycarbonate | x | ○ | ○ | ○ | ○ | ○ |
| Polyvinylchloride | x | ○ | ○ | ○ | ○ | ○ |
| Polybutylene terephthalate | x | x | x | x | ○ | x |
| Polyphenylene oxide-styrene blend | x | x | x | x | ○ | x |
| Properties (70° C. for 5 days) | | | | | | |
| Observation | yellow | yellow | yellow | yellow | yellow | yellow |
| TFT (min) | 32 | 20 | 23 | 19 | 23 | 32 |
| Bulk cure time (h) | | 16 | 20 | 20 | <48 | 24 |

TABLE 3-continued

| Formulations | Comp Ex-7 | Working Ex-8 | Working Ex-9 | Working Ex-10 | Working Ex-11 | Working Ex-12 |
|---|---|---|---|---|---|---|
| Hardness | | | | | | |
| Top/bottom | | 52/32 | 50 | 50/32 | 35 | 43 |
| Top/bottom/3 d | | 52/48 | 55/40 | 55/45 | 50 | 45 |
| Adhesion | | | | | | |
| Copper | ○ | ○ | ○ | ○ | ○ | ○ |
| Aluminum | ○ | x | ○ | ○ | ○ | x |
| Glass | ○ | ○ | ○ | ○ | ○ | ○ |
| Epoxy glass | ○ | ○ | ○ | ○ | ○ | ○ |
| Polycarbonate | x | ○ | ○ | ○ | ○ | ○ |
| Polyvinylchloride | x | ○ | ○ | ○ | ○ | ○ |
| Polybutylene terephthalate | x | x | x | x | ○ | x |
| Polyphenylene oxide-styrene blend | x | x | x | x | ○ | x |

The comparative examples C1-C4 and Examples 1-2 show the effect of the combination of carboxylic acid and the amino-silanes as a catalyst replacement for metal-based catalysts including tin-based catalysts. If the tin catalyst is replaced by the Versatic acid or aminosilanes alone as shown in comparative example C1 and C2 compared to C3 and C4, the Tack-Free-Time and Bulk Cure Time are enlarged. If a combination of carboxylic acid and amino-containing silane is used as shown in the Examples 1-2, the Tack-Free-Time and Bulk Cure Time gets shorter. In addition the level of hardness is gets affected.

Working examples 3-7 and comparative example C5-C6 show the effect of the replacement of the tin catalyst versus the inventive combination of aliphatic carboxylic acid with aminosilane and/or aminosiloxane as catalysts (Table-2). The simple replacement of the tin catalyst by the combination of lower loading (0.03 parts instead of 0.2 parts in the formulations described in Table-1) of Versatic acid with amino-silane results in enlarged TFT (See Examples 3-6), whereas the combination of lower loading of Versatic acid along with amino-silanes and aminosiloxane as shown in comparative example 7, results in similar TFT and bulk cure & better hardness properties as compare to C5 and C6. And the combination of aliphatic carboxylic acid with aminosilane and aminosiloxane as catalysts not only shows improved cure behavior they also possess improved adhesion properties (as shown in Examples 6 and 7).

Similarly, working examples 8-12 show the effect of different aliphatic carboxylic acids with aminosilane and/or aminosiloxane as catalysts. VA1531 is a neononanoic acid, and Versatic acid 1532 is a C9-C13 fatty acid. The carboxylic acids, in combination with the aminosilane and/or aminosiloxane provide comparable or improved cure properties and physical properties compared to example C7. Additionally, Examples 8-12 exhibit good adhesion to a variety of surfaces.

Embodiments of the invention have been described above and modifications and alterations may occur to others upon the reading and understanding of this specification. The claims as follows are intended to include all modifications and alterations insofar as they come within the scope of the claims or the equivalent thereof.

We claim:

1. A composition for forming a cured polymer composition comprising:
   (A) a polymer having at least a reactive silyl group;
   (B) a crosslinker or chain extender chosen from an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkarylaminosiloxane, an alkoxycarbamatosilane, an alkoxycarbamatosiloxane, and combinations of two or more thereof;
   (C) a carboxylic acid component in an amount of from about 0.01 to 7 pt. wt. per 100 pt. wt. of component (A);
   (D) at least one amino-containing adhesion promoter of a silane other than the compounds listed under (B) in an amount of from about 0.1 to about 5 pt. wt. per 100 pt. wt. of component (A);
   (E) an amino-functional siloxane other than the compounds listed under (B) in an amount of about 0.1 to about 5 pt. wt. per 100 pt. wt of component (A); and
   (F) optionally a filler component, wherein the composition is substantially free of a metal-based catalyst.

2. The composition of claim 1, wherein the carboxylic acid component (C) comprises an aliphatic carboxylic acid.

3. The composition of claim 1, wherein the carboxylic acid component comprises a branched alkyl $C_4$-$C_{30}$-alkyl carboxylic acid.

4. The composition of claim 1, wherein the carboxylic acid component comprises a $C_5$-$C_{30}$ carboxylic acid with alpha tertiary carbon.

5. The composition of claim 1, wherein the carboxylic acid is chosen from propanoic acid, 2-methyl propanoic acid, butanoic acid, pentanoic acid (valeric acid), hexanoic acid (caproic acid), 2-ethylhexanoic acid, heptanoic acid (enanthic acid), octanoic acid (caprylic acid), oleic acid, linoleic acid, linolenic acid, cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, or a combination of two or more thereof.

6. The composition of claim 1 comprising component (C) in an amount of from about 1.0 to 7 pt. wt. per 100 pt. wt. of component (A).

7. The composition of claim 1 comprising component (C) in an amount of from about 0.2 to 0.4 pt. wt. per 100 pt. wt. of component (A).

8. The composition of claim 1, wherein the component (D) is chosen from N-(2-aminoethyl)aminopropyltrimethoxysilane gamma-aminopropyltriethoxysilane, gamma-aminopropyltrimethoxysilane, bis(gamma-trimethoxysilylpropyl)

amine, N-phenyl-gamma-aminopropyltrimethoxysilane, triaminofuntionalltrimethoxysilane, gamma-aminopropyltrimethoxysilane, gamma-aminopropylmethyldiethoxysilane, N-phenyl-gamma-aminopropyltrimethoxysilane, omega-bis-(aminoalkyl-diethoxysilyl)-polyclimethylsiloxane having an average polymerization degree of ($P_n$=1-7), alpha, omega-bis-(aminoalkyl-cliethoxysilyl)-octa-methyltetrasiloxane, 4-amino-3,3,-dimethyl-butyl-tri-methoxysilane, and N-ethyl-3-tri-methoxy-silyl-2-methylpropanamine, 3-(diethyl-aminopropyl)-trimethoxysilane or a combination of two or more thereof.

9. The composition of claim 1, wherein the amino-containing adhesion promoter is chosen from gamma-(2-aminoethyl)aminopropyltrimethoxysilane gamma-aminopropyltriethoxysilane, gamma-aminopropyltrimethoxysilane, bis(gamma-trimethoxysilypropyl)amine, N-phenyl-gamma-aminopropyltrimethoxysilane, triaminofunctionaltrimethoxysilane, gamma-aminopropylmethyldimethoxysilane, gamma-aminopropylmethyldiethoxysilane, omega-bis-(aminoalkyl-diethoxysilyl)-polyclimethylsiloxanes having an average polymerization degree of ($P_n$=1-7), alpha, omega-bis-(aminoalkyl-diethoxysilyl)-octa-methyltetrasiloxane, 4-amino-3, 3,-dimethyl-butyl-tri-methoxysilane, N-ethyl-3-tri-methoxy-silyl-2-methylpropanamine, 3-(diethyl-aminopropyl)-trimethoxysilane, or a combination of two or more thereof.

10. The composition of claim 1 comprising from about 0.1 to about 5 pt. wt. of amino-containing adhesion promoter (D) per 100 pt. wt of component (A).

11. The composition of claim 1 comprising an amino-functional siloxane chosen from (2-aminoethyl)methylpolysiloxane, (3-aminopropyl)methylpolysiloxane, (2 -aminoethyl-3-aminopropyl)methylpolysiloxane, (3-(2-aminoethoxy)propyl)methylpolysiloxane, (6-aminohexyl)methylpolysiloxane, (3-(2-aminoethoxy)propyl)methylpolysiloxane, (3-(2-aminoethylaminopropyl)methylsiloxane, dimethylsiloxane copolymers thereof, or a combination of two or more thereof.

12. The polymer composition of claim 1, wherein the polymer (A) has the formula (2)

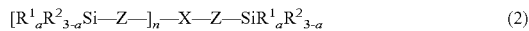

$$[R^1_a R^2_{3-a}Si-Z-]_n-X-Z-SiR^1_a R^2_{3-a} \quad (2)$$

where X is chosen from a polyurethane; a polyester; a polyether; a polycarbonate; a polyolefin; a polypropylene; a polyesterether; and a polyorganosiloxane having units of $R_3SiO_{1/2}$, $R_2SiO$, $RSiO_{3/2}$, and/or $SiO_{4/2}$, n is 0 to 100, a is 0 to 2, R and $R^1$ can be identical or different at the same Si-atom and chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof, $R^2$ is chosen from OH, a $C_1$-$C_8$-alkoxy, a $C_2$-$C_{18}$-alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is a bond, a divalent unit selected from the group of a $C_1$-$C_8$ alkylene, or O.

13. The composition of claim 1 wherein the crosslinker component (B) is chosen from tetraethylorthosilicate (TEOS); a polycondensate of TEOS; methyltrimethoxysilane (MTMS); vinyl-trimethoxysilane; methylvinyclimethoxysilane; dimethylcliethoxysilane; vinyltriethoxysilane; tetra-n -propylorthosilicate; vinyltris (methylethylketoxime)silane; methyltris (methylethylketoxime)silane; trisacetamidomethylsilane; bisacetamidoclimethylsilane; tris(N-methyl-acetamido) methylsilane; bis(N-methylacetamido)dimethylsilane; (N-methyl-acetamido)methyldialkoxysilane; trisbenzamidomethylsilane; trispropenoxymethylsilane; alkyldialkoxyamidosilanes; alkylalkoxybisamidosilanes; $CH_3Si(OC_2H_5)_{1-2}(NHCOR)_{2-1}$; $(CH_3Si(OC_2H_5)(NCH_3COC_6H_5)_2$; $CH_3Si(OC_2H_5)-(NHCOC_6H_5)_2$; methyldimethoxy (ethylmethylketoximo)silane; methylmethoxybis-(ethylmethylketoxime)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisopropenoxysilane; methyltri-iso-propenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane; dimethyldi-N,N-diethylaminosilane; ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido) silane; methylmethoxybis(N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane.; methyldimethoxythioisocyanatosilane; methylmethoxyclithioisocyanatosilane, or a combination of two or more thereof.

14. The composition of claim 1, comprising about 1 to about 10 wt. % of the crosslinker component (B) based on 100 wt. % of the polymer component (A).

15. The composition of claim 1, wherein the cross-linker component (B) is chosen from a silane or a siloxane, the silane or siloxane having two or more reactive groups that can undergo hydrolysis and/or condensation reaction with polymer (A) or on its own in the presence of water and component (F).

16. The composition of claim 1, wherein the polymer component (A) is chosen from a polyorganosiloxane comprising divalent units of the formula [$R_2SiO$] in the backbone, wherein R is chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof.

17. The polymer composition of claim 16 wherein the polymer component (A) has the formula (3):

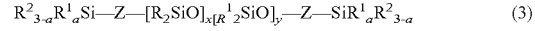

$$R^2_{3-a}R^1_a Si-Z-[R_2SiO]_x[R^1_2SiO]_y-Z-SiR^1_a R^2_{3-a} \quad (3)$$

whereby x is 0 to 10000;

y is 0 to 1000;

a is 0 to 2;

R is methyl;

$R^1$ is chosen from a $C_1$-$C_{10}$-alkyl; a $C_1$-$C_{10}$alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof, and other siloxane units may be present in amounts less than 10 mol. %;

$R^2$ is chosen from OH, a $C_1$-$C_8$-alkoxy, a $C_2$-$C_{18}$-alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is —-O—, bond, or —$C_2H_4$—.

18. The composition of claim 1, wherein the composition is provided as a one part composition.

19. The composition of claim 1, wherein the composition is provided as a two part composition comprising a first portion (P1) and a second portion (P2).

20. The composition of claim 1 comprising:
100 pt. wt of component (A),
0.1 to about 10 pt. wt of at least one crosslinker (B),
0.01 to about 7 pt. wt. of a carboxylic acid (C),
0.1 to about 5 pt. wt. of an amino-containing adhesion promoter (D),
0.1 to about 5 pt. wt. of an amino-functional siloxane (E),
0 to about 300 pt. wt of component (F),
0.01 to about 8 pt. wt. of a component (G) chosen from a plasticizer, pigment, stabilizer, antimicrobial, fungicide, biocide, solvent, water, or a combination of two or more thereof,
whereby this composition can be stored in the absence of humidity and is curable in the presence of humidity upon exposure to ambient air.

21. The composition of claim 1, wherein the composition is substantially free of a metal catalyst, a metal-based catalyst, or both.

22. A method of providing a cured material comprising exposing the composition of claim 1 to ambient air.

23. A method of providing a cured material comprising combining the first portion and the second portion of claim 19 and curing the mixture.

24. The cured polymer material of claim 23 in the form of an elastomeric or duromeric seal, an adhesive, a coating, an encapsulant, a shaped article, a mold, and an impression material.

25. A cured polymer material formed from the composition of claim 1.

* * * * *